United States Patent [19]

Ferdelman

[11] 4,144,930
[45] Mar. 20, 1979

[54] TIMER FOR HEAT-COOL ROOM AIR CONDITIONER

[75] Inventor: Donald C. Ferdelman, Dayton, Ohio

[73] Assignee: General Motors Corporation, Detroit, Mich.

[21] Appl. No.: 842,277

[22] Filed: Oct. 14, 1977

[51] Int. Cl.² ............................ F24F 1/04; F25B 19/00
[52] U.S. Cl. ............................................. 165/12; 62/231
[58] Field of Search ........................... 165/12, 26, 27; 236/46 R; 62/231

[56] References Cited

U.S. PATENT DOCUMENTS 3,831,663  8/1974  Pithie ................................... 165/26
4,041,723  8/1977  Weibel, Jr. et al. ............... 62/231 X Primary Examiner—William E. Wayner
Attorney, Agent, or Firm—Edward P. Barthel

[57] ABSTRACT

An improved heat-cool room air conditioner unit control system having an electric timer located at the control area with the timer including a timer motor which runs continuously. A multi-gang selector switch is arranged in the control circuit with timer contacts and a single pole-double throw relay contact such that the selector switch and relay will selectively operate the unit in either a timed cooling mode or an untimed demand heating mode.

1 Claim, 5 Drawing Figures

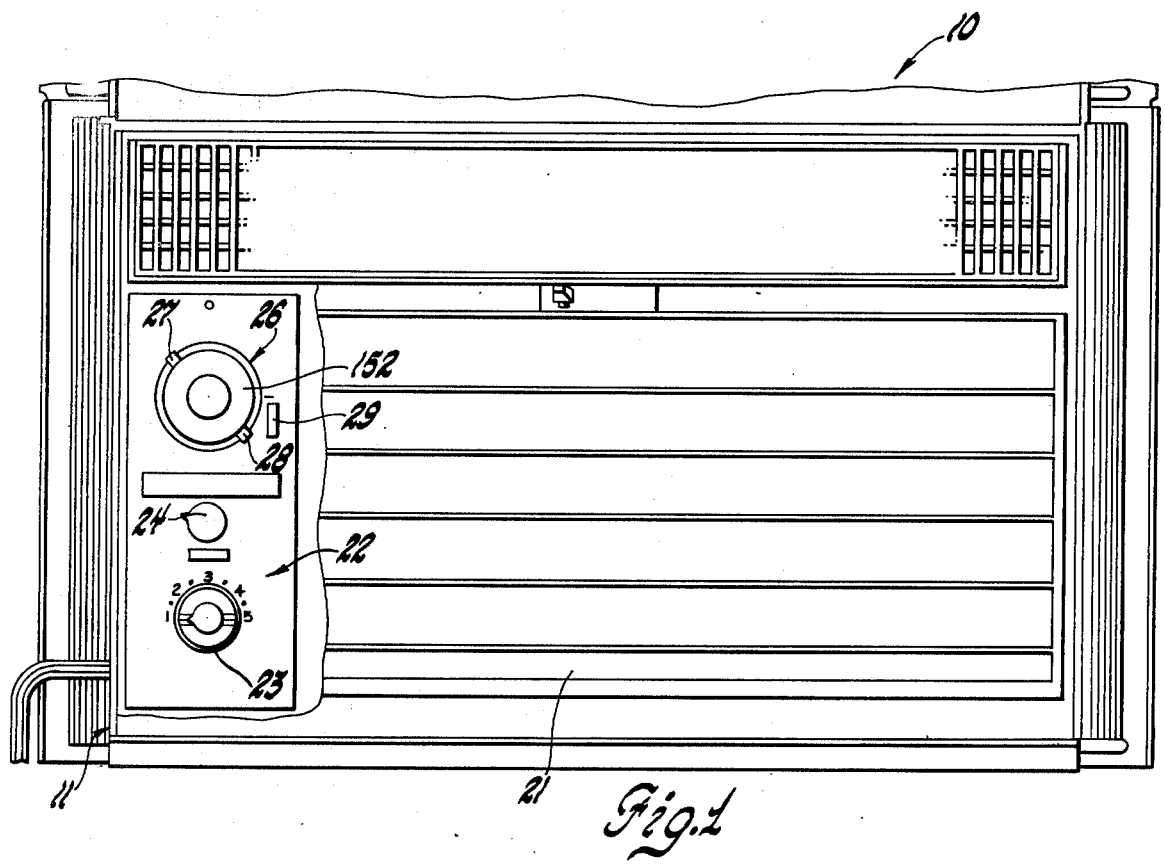
Fig. 1
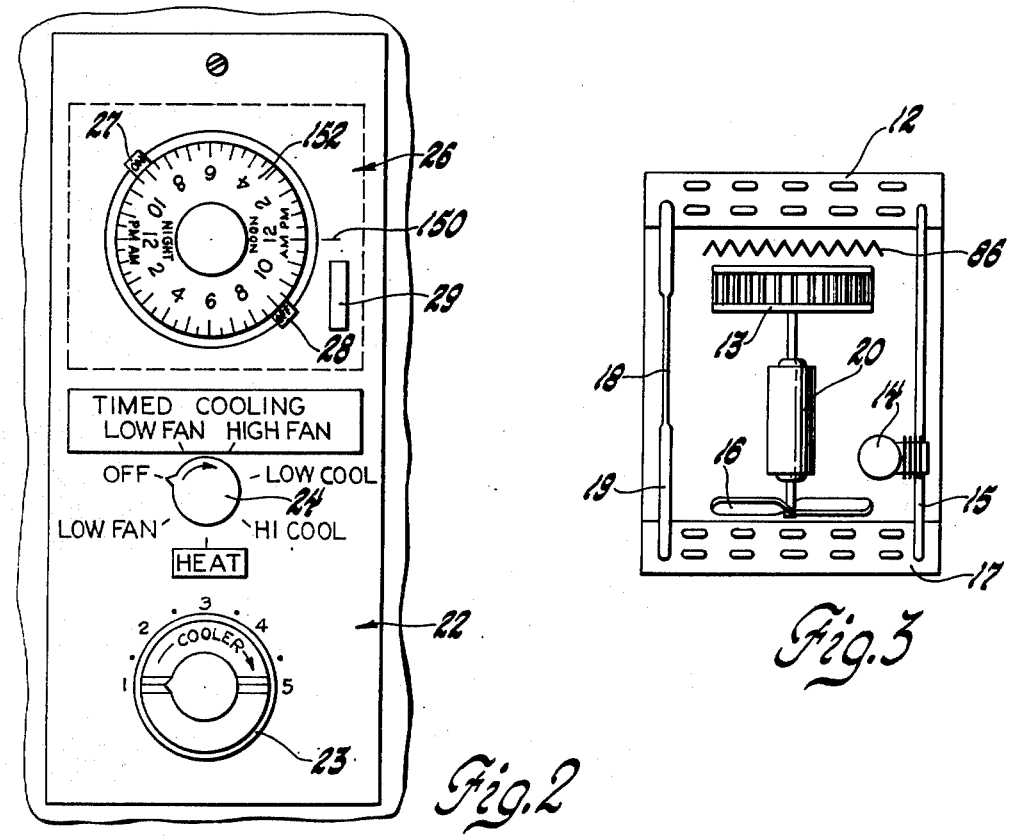
Fig. 2
Fig. 3

|  | FUNCTION | SHAFT POSITION | CIRCUITS ||||||| 
|---|---|---|---|---|---|---|---|---|---|
|  |  |  | T10-T1 | T10-T2 | T11-T4 | T7-T8 | T7-T9 | T3-T12 | T5-T6 |
| 1ST | HEAT | FULL CCW | X |  |  |  | X | X | X |
| 2ND | LOW FAN | CW 51.4 | X |  |  |  |  |  |  |
| 3RD | OFF | CW 102.9 |  |  |  |  |  |  |  |
| 4TH | TIMED LOW COOL | CW 154.3 | X |  |  | X |  |  |  |
| 5TH | TIMED HI COOL | CW 205.7 |  | X |  | X |  |  |  |
| 6TH | LOW COOL | CW 257.1 | X |  | X | X |  |  |  |
| 7TH | HIGH COOL | CW 308.6 |  | X | X | X |  |  |  |
|  |  |  | LOW FAN | HI FAN | TIMER SHUNT | COMP. & FAN | HEATER | HEATER | HEATER |

*Fig.5*

TIMER FOR HEAT-COOL ROOM AIR CONDITIONER

This invention relates to a self-contained room air conditioner unit and is directed to a heat-cool room air conditioner control circuit containing a timer located at the control panel area which is selectively operated in conjuction with the unit's control system for either a timed cooling mode or an untimed demand heating mode.

Prior art room air conditioner units, as represented by U.S. patent application Ser. No. 738,612 now U.S. Pat. No. 4,041,723, and assigned to the assignee of the present application, disclose a room air conditioner unit having an electric timer located at the control area with the timer including a timer motor which runs continuously and timer switch electrically connected in the unit's control circuit with a manually operable selector switch. The timer switch movable indicators may be preset to the exact A.M. or P.M. time the user wishes the air conditioner turned on and turned off. Further, the user may select either a timed electricity saver mode wherein the fan motor cycles on and off with the compressor or a timed cooling mode wherein the fan runs continuously while the compressor is cycled by the unit thermostat.

It is an object of the present invention to provide an improved room air conditioner control circuit for a heat-cool unit which allows a timer to operate the unit in a timed cooling mode for a predetermined time in accordance with the start and stop time as preselected by the manually operable time preselector and in its heating mode the selector switch portions thereof enable the energization of relay means bypassing the timer to allow the fan motor to run continuously.

Another object of the present invention is to provide a heat-cool room air conditioner control circuit having an electric timer located in the unit's control area with the timer including a timer motor and timer switch having first and second fixed contacts adapted to be opened and closed by a movable contact and electrically connected in the control circuit, wherein the unit's rotary selector switch in one user selected position allows the user to preselect when the timer switch shall close and open to provide two timed cooling positions that will cycle the complete unit on and off at a preset time of day and upon said rotary selector switch being positioned in its heating mode enable the deenergization of a relay coil causing the relay contacts to bypass the timer switch to operate the fan motor continuously in the heating mode.

Further objects and advantages of the present invention will be apparent from the following description, reference being had to the accompanying drawings wherein a preferred embodiment of the present invention is clearly shown.

FIG. 1 is a front elevational view of the room air conditioner front assembly with parts broken away, to show the control area;

FIG. 2 is a fragmentary enlarged view of the room air conditioner control area;

FIG. 3 is a diagrammatic view of the heat-cool air conditioning unit to which the control system is applied;

FIG. 5 is a functional chart showing the positions of the selector switch to perform the desired functions.

Figure 4:
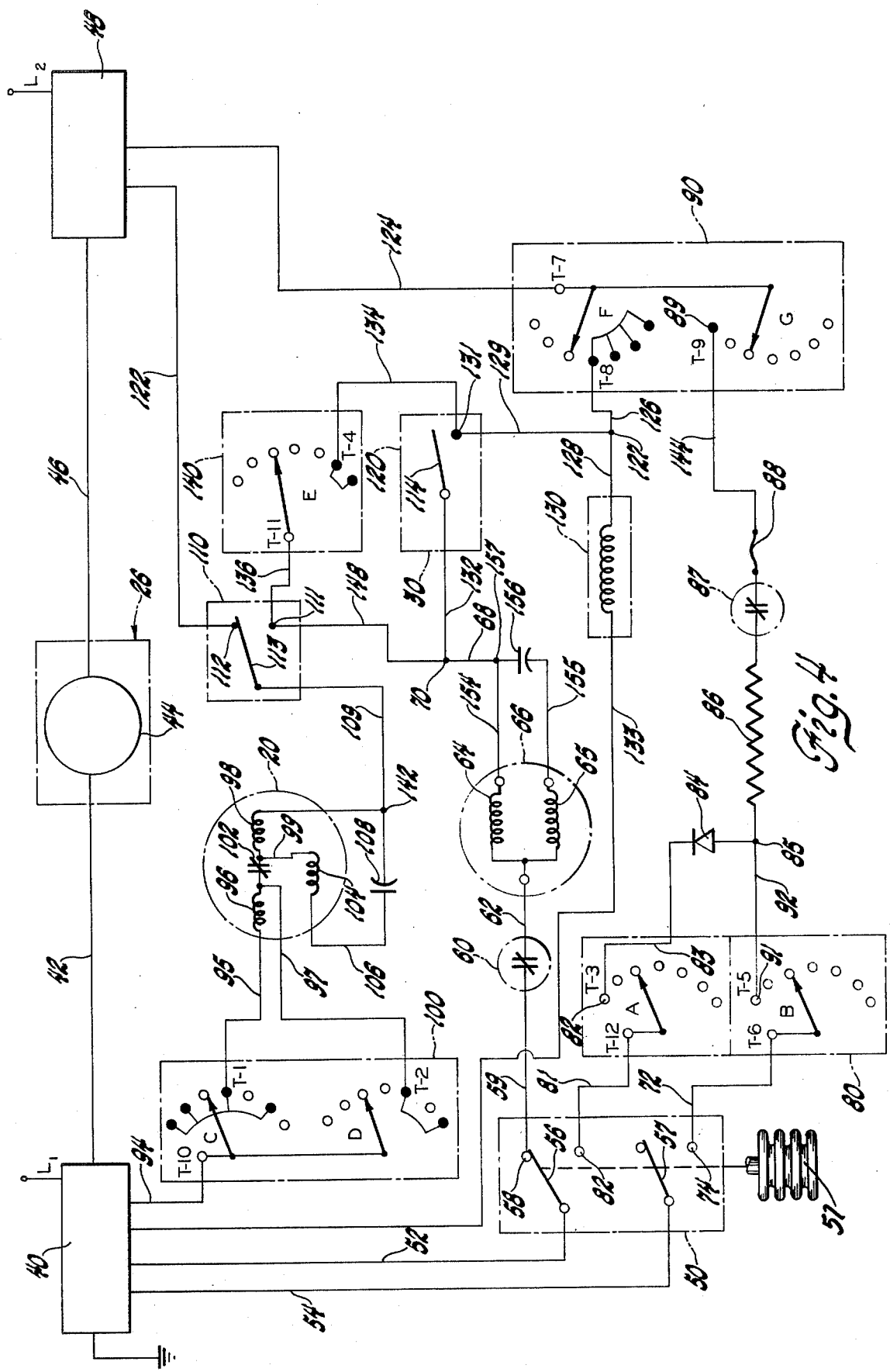
FIG. 4 is a schematic wiring diagram illustrating the control system for the timed heat-cool room air conditioning unit.

Referring now to the drawings and more particularly to FIGS. 1 and 3, there is shown a room air conditioner 10 provided with an outer shell 11. Within the shell a base (not shown) supports a refrigeration system including a compressor, condenser, restrictor and evaporator of the refrigerant circuit as well as room and outside air circulating fans. The construction of these parts may be similar to those of window unit air conditioners now being commercially manufactured, examples of which are illustrated in commonly assigned U.S. Pat. Nos. 3,792,593 and 3,592,123.

For the purposes of the present invention, it is only necessary to understand that the cabinet shell serves to enclose the operative components of the air conditioner unit including an evaporator 12 which is typically located in the front of the cabinet across most of the planar extent thereof; and air circulating fan 13 for drawing air across the evaporator for cooling it and then for returning the circulated air back into the room being cooled by the unit.

As seen in FIG. 3, the unit further includes an electric motor-driven refrigerant compressor 14 which connects by line 15 in series flow relationship with a condenser 17 and expansion device 18 in line 19 to the evaporator 12 which in turn is connected to the inlet of the compressor. Outdoor air fan 16 and circulating fan 13 are both operated by fan motor 20. The front assembly includes a horizontally slidable baffle 21, illustrated in its closed position, with a portion broken away to show control panel escutcheon plate 22 having control components including a thermostat regulating knob 23.

The control panel 22 includes a rotatable selector switch knob 24 having a plurality of positions which in the disclosed embodiment provides six selectable positions as shown by the FIG. 5 chart. Mounted on the control area with the selector switch knob 24 is a timer 26 including movable indicator 28 which is moved around the time dial clock for pointing to the exact A.M. or P.M. time the user wishes the air conditioner turned off. A push button on-off convenience switch 29 is provided for the timer to allow the user to reverse the mode of the timer 26. Positioning of indicator 27 establishes a time when coupling means will be effective to close timer switch 30 (FIG. 4); in similar fashion the position of indicator 28 determines when coupling means will be effective to open the timer switch 30. This time clock mechanism is conventional and may be of the type manufactured by Intermatic Incorporated and is illustrated solely for the purpose of explaining a suitable manner in which the present invention may be operated.

In FIG. 4 supply conductor $L_1$ from a suitable 115V or 230V electrical power source is connected to a terminal block 40. A line 42 from the block connects to one side of timer motor 44 while line 46 connects the other side of the timer motor 44 to terminal block 48 which is fed by the $L_2$ side of the power source.

A dual stage thermostat 50 is connected to the terminal block 40 by conductors 52 and 54 to respective first and second stage movable switch members 56 and 57 of the dual stage thermostat. The thermostat has sensing means such as a bellows 51 which is fluid responsive to room air temperature. The first stage switch 56 is a single pole-double throw snap action movable contact and at higher room temperatures of the thermostat 50, such as, for example 76° F., this switch member 56 will be moved into engagement with an upper or first fixed contact 58. Contact 58 is connected by a conductor 59 to a motor protector in the form of an overload bimetal thermostat 60 which is in turn connected by line 62 to the main winding 64 and phase winding 65 of motor 66 for compressor 14. The line 68 connects the opposite side of the compressor motor main winding 64 to a first common terminal 70.

Conductor 72 connects the fixed contact 74 of a secondary single pole switch 57 of the thermostat 50 to movable switch blade B of a first selector switch 80 of a multiple selector control which in the disclosed form is rotary selector switch means operated by knob 24. The first selector switch 80 has a movable switch blade A connected by line 81 to lower fixed contact 82 of thermostat switch 56, while blade A has its upper first fixed contact 82 connected by line 83 to the cathode of a diode rectifier 84 which has its anode in turn connected to junction 85 on one side of electrical heater 86. An overload thermostat 87 is connected to the other side of the heater 86 while a fuse 88 is inserted in line between the thermostat 87 and the first contact 89 of a movable contact blade G of multiple selector control third selector switch 90. The movable switch blade B has its first contact 91 connected by line 92 and junction 85 to the anode of diode 84 and the one side of heater 86. Reference may be had to U.S. Pat. No. 3,666,002—Ferdelman, for a description of the rectifying action of diode 84 which conducts only during one-half the normal cycle resulting in approximately one-half of the maximum wattage of output when the diode rectifier is placed in the circuit by the selector switch 80.

The supply conductor $L_1$ connects to movable switch blades C and D of second selector switch 100 through conductor 94 connected from the terminal block 40. It will be seen that line 95 connects the first, second, fourth and sixth fixed contacts of blade C with the low speed winding 96 of the fan motor 20. The fifth and seventh fixed contacts of the switch blade D are connected by line 97 to the junction of the low speed winding 96 and the high speed winding 98 of the fan motor. A line 99 connects the junction of fan internal motor protector 102 and the winding 98 with motor phase winding 104 which is in turn connected by line 106 to fan capacitor 108.

The fan capacitor 108 is connected by line 109 to relay 110. The relay 110 is a single pole-double throw relay having first 111 and second 112 fixed contacts and a movable contact 113. It will be seen that the relay first fixed contact 111 and movable contact 114 of timer switch 30 are connected to the first common terminal 70. Further, the relay second fixed contact 112 is connected by line 122 to the second supply conductor $L_2$ via terminal block 48.

The third selector switch 90 has its movable contact blades F and G connected by line 124 to the second supply conductor $L_2$ via block 48. Also the fourth, fifth, sixth and seventh fixed contacts of blade F are connected by line 126, junction 127 and line 128 to one side of operating coil 130 of the relay 110. The junction 127 is shown connected by line 129 to the fixed contact 131 of single throw timer switch 30 while its movable contact 114 is connected by line 132 to the first common terminal 70. The other side of the operating coil 130 is connected by line 133 to terminal block 40 and the $L_1$ side of the power source.

It will be seen that the fourth selector switch 140 has its sixth and seventh fixed contacts connected by line 134 to the first fixed contact 131 of the timer switch 30 while its movable contact blade E is connected by line 136 to the first fixed contact 111 of the relay 110.

It will be seen in FIGS. 2, 4 and 5 that with the air conditioner unit 10 plugged-in supplying power to the $L_1$ and $L_2$ sides of the power source and with selector knob 24 in its full counterclockwise HEAT position, the movable blades of selective contact switches A, B, C, D, E, F and G are each in contact with their respective first fixed contacts. The result is that a circuit is completed from the $L_1$ side of the power source through conductor 94 terminal T-10 of the second selector switch 100, through blade C and contact terminal T1, line 95 and fan motor low speed winding 96. The circuit thence branches to terminal 142 by a first path via high speed winding 98 and a second path via phase winding 104 and fan capacitor 108 to the terminal 142 which terminal is connected by line 109 to the movable relay contact 113 contacting its upper contact 112. From contact 112 the low speed fan motor circuit is completed through line 122 to the $L_2$ side of the power source to by-pass or isolate the timer switch 30 and provide one hundred percent run time for the fan motor 20 during the demand heating mode. At the same time the heater 86 is energized to provide full staged heating by a circuit from $L_1$, line 54 to the thermostat lower movable contact 57 closed on fixed contact 74, line 72, terminal port T6 of the first selector switch 80, blade B, terminal contact T5, heater 86, and line 144 to terminal contact T9 of the third selector switch 90. The heater circuit is completed through T-7 and line 124 to the $L_2$ side of the power source. The one-half heater circuit is from $L_1$, line 52, movable upper thermostat contact 56 contacting its fixed contact 82, line 81 to terminal T12, blade A, selector switch contact T3, line 83, diode 84 and thence to $L_2$ as described above. Movable contact 57 is open during the one-half heating mode.

To provide a LOW FAN mode of operation without heat the knob 24 is rotated to its second position wherein the fan motor is energized as described above. It will be seen that with the first selector switch blades A and B contacting their second fixed contacts the heater 86 is removed from the circuit.

Upon the knob 24 rotated to its third OFF position the movable blades A-G are as shown in FIG. 4 in contact with their respective open circuited third fixed contacts. The result is that with the unit plugged-in the only circuit that is completed is from the $L_1$ side of the power source through conductor 42, timer rotor 44 and line 46 to the $L_2$ side of the power source whereby the timer motor runs continuously. As explained in co-pending U.S. patent application Ser. No. 738,612, now U.S. Pat. No. 4,041,723, the timer thus operates to tell the user the time of day by means of an indicator marking 150 on the escutcheon plate of control panel 22, which indicator is shown pointing to the twelve noon marking on the time dial 152.

Upon the knob 24 being moved counterclockwise to its fourth TIMED COOLING LOW FAN position the fan motor 20 is energized in slow speed mode through selector blade C as described above. It will be noted, however, that with the third selector switch blade F, connected to $L_2$, contacts terminal contact T8 which is in turn connected by lines 126 and 128 to the relay coil 130. As the other side of coil 130 is connected to $L_1$ by line 133 the coil is energized to close relay movable contact 113 to its active fixed contact 111 and thence via line 148, junction 70, line 132 to the movable timer contact 114, the fixed timer contact 131, line 129, junction 127, line 126, terminal T8 and blade F to the $L_2$ side. Thus, upon the timer contacts closing at any preset time selected by the user the compressor 66 circuit is completed via main winding line 154, phase winding line 155 and run capacitor 156 to junction 157, line 68, common junction 70, line 132, closed timer contacts 114 and 131, line 129, junction 127, line 126 to T8 and blade contact F to $L_2$. In this way timed low fan cooling is provided.

With the knob 24 moved to its fifth TIMED COOLING HIGH FAN position the fan motor 20 high speed winding 98 is energized via $L_1$, line 94, terminal T10, blade D, terminal contact T2 and line 97. In other respects the circuit is the same as for the described fourth position.

Upon the knob 24 being rotated to its sixth non-timed LOW COOL position the circuit is the same as for the fourth position except that the fourth selector switch 140 provides a circuit from the energized relay contact 111, line 136, blade E, terminal contact T4, line 134, contact 131, line 129, junction 127, line 126, terminal T8 and blade F to $L_2$. In this mode the fan motor 20 runs one hundred percent of the time and the timer switch is shunted or by-passed.

With the knob 24 rotated to its last or seventh HIGH COOL position the circuit is the same as described for the sixth position except that the fan motor 20 is run via its high speed circuit as described for the fifth position.

While the embodiment of the present invention as herein disclosed constitutes a preferred form, it is to be understood that other forms might be adopted.

I claim:

1. A timed control circuit for a self-contained room air conditioner unit operable to selectively heat or cool air, the combination of a housing enclosing a compressor driven by a motor, a condenser, an evaporator connected in a refrigerant circuit and a fan driven by a multiple speed electric motor for circulating room air to be cooled into heat exchange relation with said evaporator; said fan motor having low and high speed terminals, electric resistance heater means disposed between said fan and said evaporator for heating the circulating air, and in which said housing has a room-side section with a control area thereon; an electric timer located at said control area, said timer including a timer motor and a timer switch having a fixed contact and a movable contact electrically connected in a control circuit, said timer including manually operable time preselector means to preset when said timer switch shall close and open by selecting start and stop times for selectively controlling the cooling time of said unit, said control circuit including first and second supply conductors adapted for connecting the compressor motor and the fan motor to a power source; said timer motor connected between said first and second supply conductors whereby it runs continuously with said unit, a thermostat switch means connected to said first supply conductor and having first and second contacts operative to cycle said compressor on and off in response to the temperature of the circulating cooling air; the improvement wherein a multi-position manual rotary control connected in said control circuit for selectively operating said unit including either a timed cooling mode or an untimed demand heating mode, a single pole-double throw relay connected in said control circuit having first and second fixed contacts and a movable contact, said relay first fixed contact and said timer movable contact connected to a first common terminal, said thermostatic switch first fixed contact connected to said compressor motor which is in turn connected to said first common terminal, said thermostatic switch first fixed contact connected to said compressor which is in turn connected to said first common terminal, said relay second fixed contact connected to said second supply conductor, said multiple selector switch means including at least first, second, third and fourth selector switches, said thermostatic switch means second fixed contact connected to said first multiple selector switch which is in turn selectively connected to one side of said heater means, said second multiple selector switch selectively connected to said first supply conductor having at least one selective contact connected to said fan motor which is in turn connected to the movable contact of said relay, said third multiple selector switch means having its first and second selective contact means connected to said second supply conductor, said first selector contact means of said third multiple selector switch means connected to one side of operating coil means of said relay and its second selective contact means connected to the other side of said heater means, said fourth multiple selector switch means having its selective contact means connected to said relay first fixed contact and one of its fixed contacts connected to the fixed contact of said timer switch, said timer switch fixed contact connected to said one side of said relay operating coil means and the other side of said relay connected to said first supply conductor, whereby when said rotary control switch is positioned in its heating mode said relay coil is deenergized causing said relay movable contact to contact said relay first fixed contact bypassing said timer switch enabling said fan motor to run continuously, and whereby when said rotary control switch is positioned in its cooling mode said relay coil is energized causing said relay movable contact to be moved into engagement with its second fixed contact enabling said timer switch contacts to be placed in series with said common terminal causing said unit to operate in its timed cooling mode for a predetermined time in accordance with the start and stop times preselected by said manually operable timer preselector.

* * * * *